Feb. 10, 1925.

J. G. DOBIE

LANDING STATION FOR AIRPLANES

Filed March 30, 1921

1,526,268

5 Sheets-Sheet 1

Inventor
James G. Dobie

By
Attorney

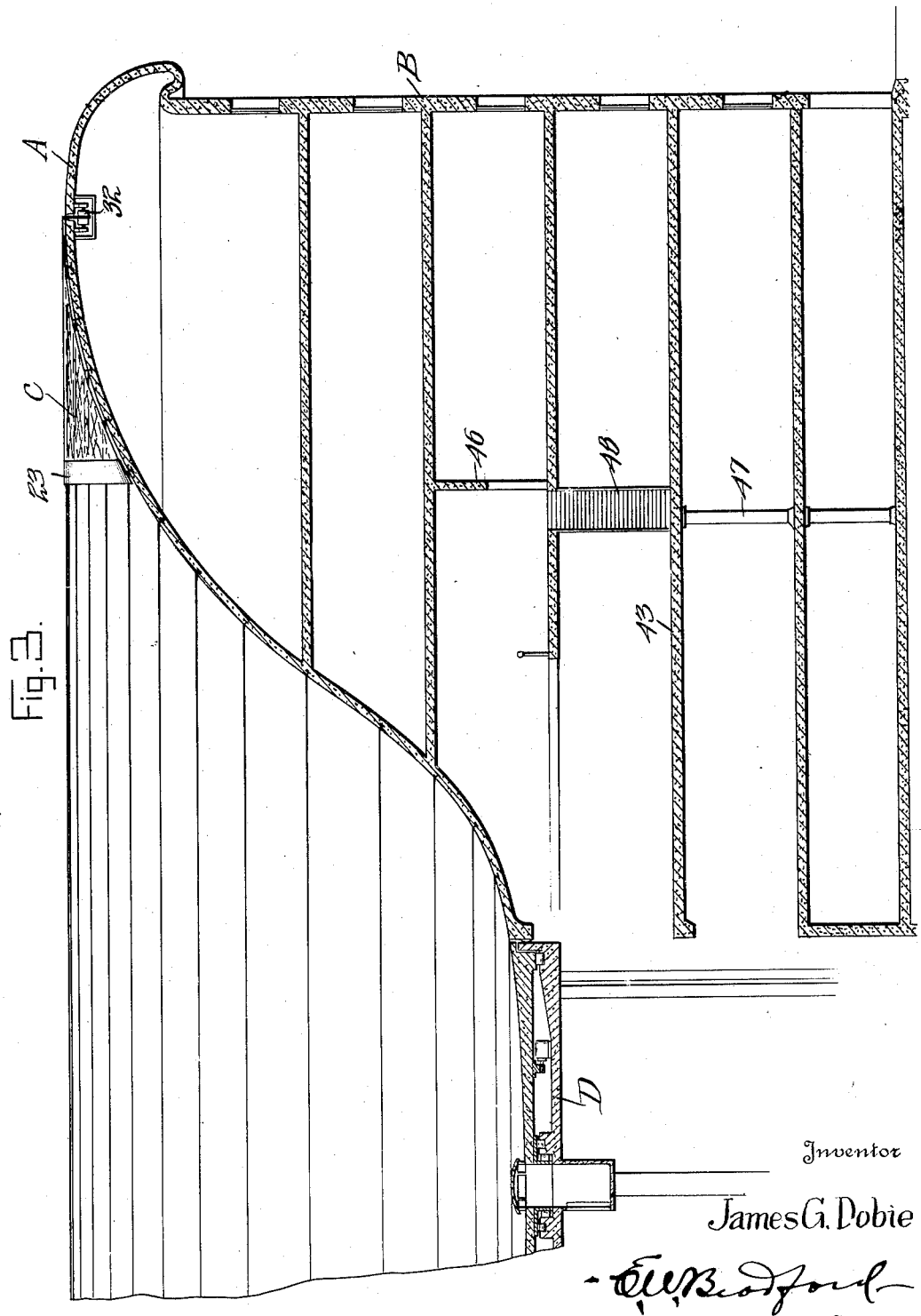

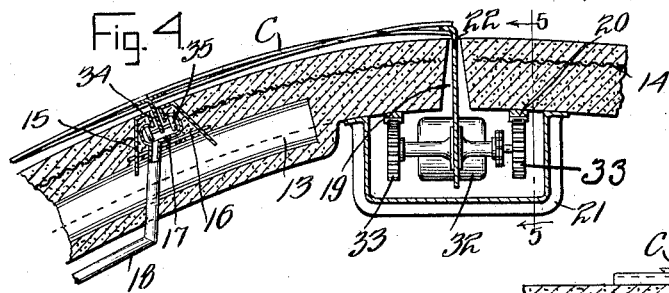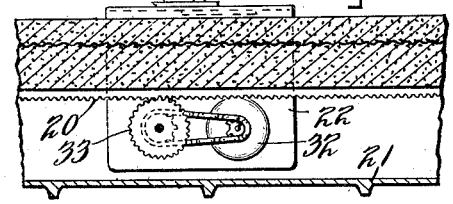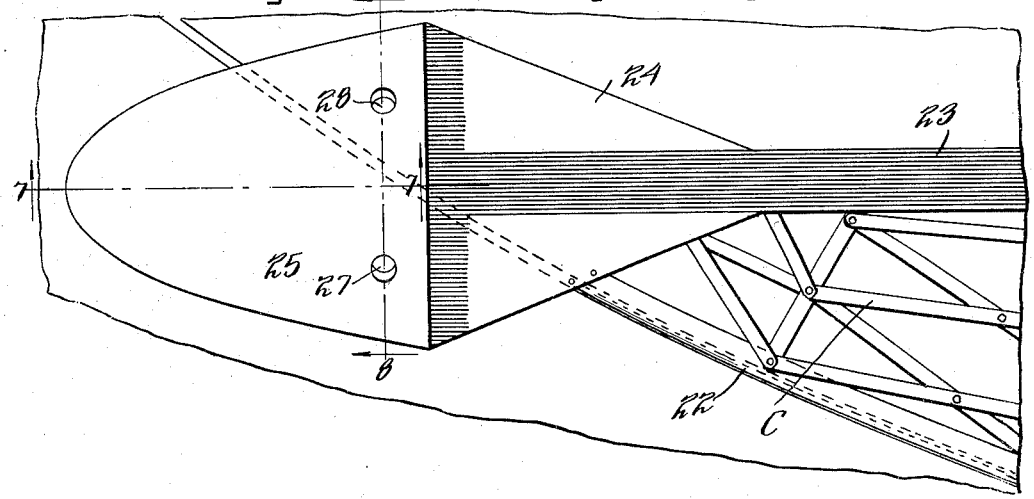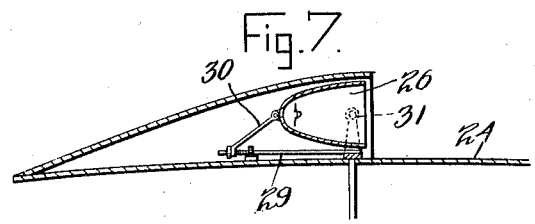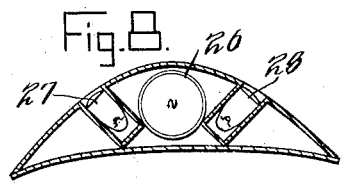

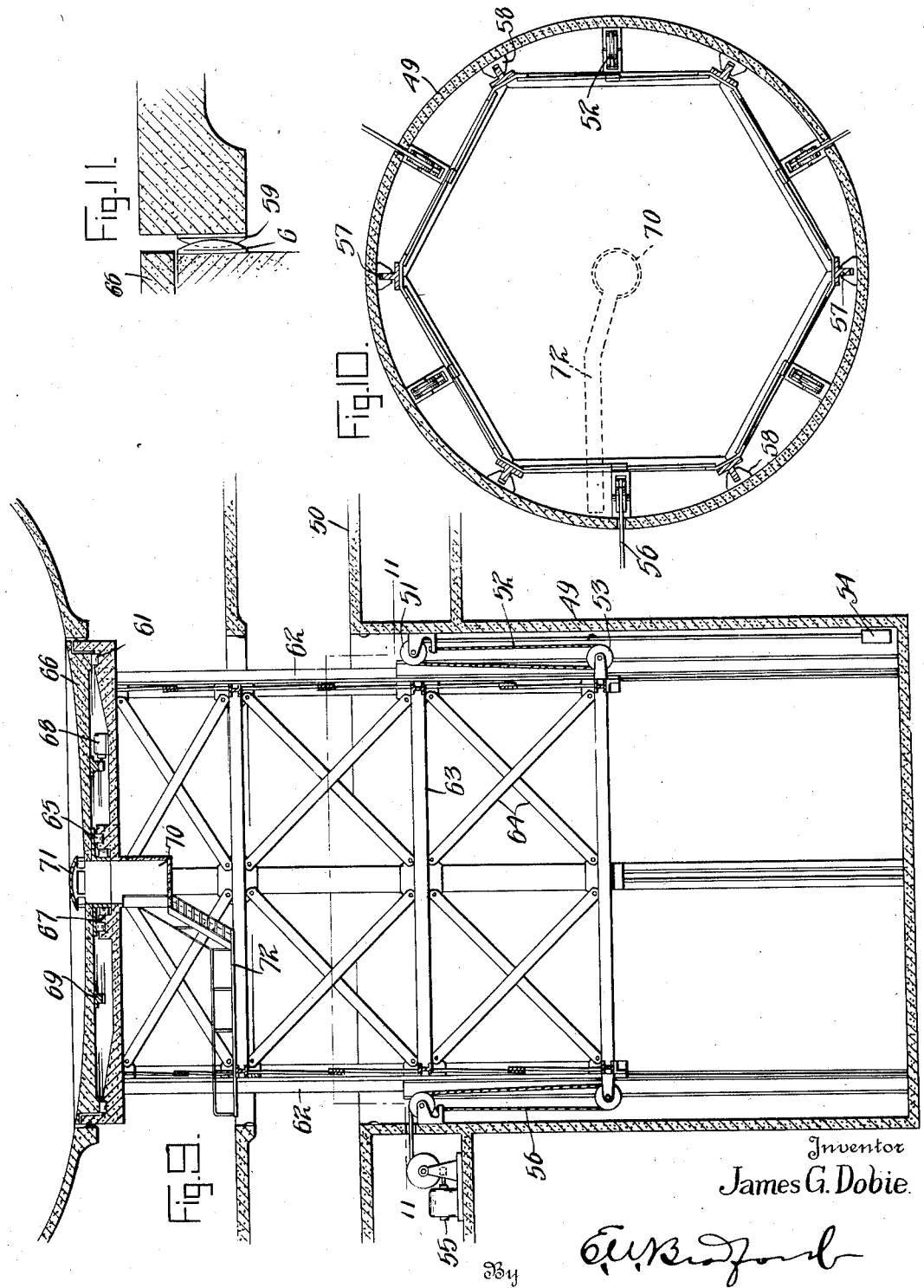

Feb. 10, 1925.
J. G. DOBIE
LANDING STATION FOR AIRPLANES
Filed March 30, 1921     5 Sheets-Sheet 5
1,526,268
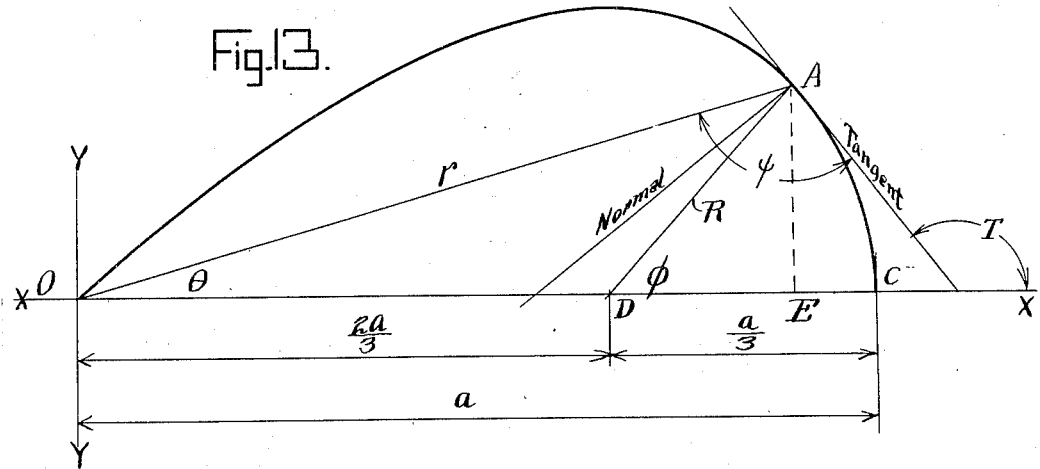
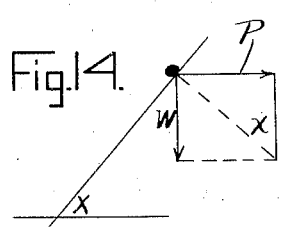
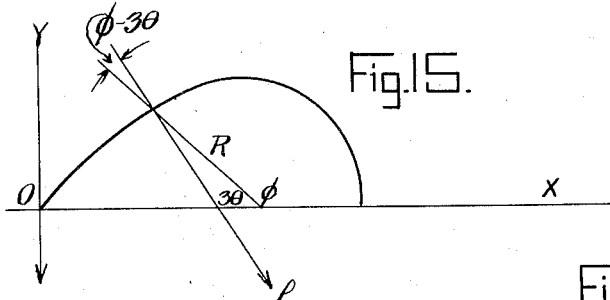
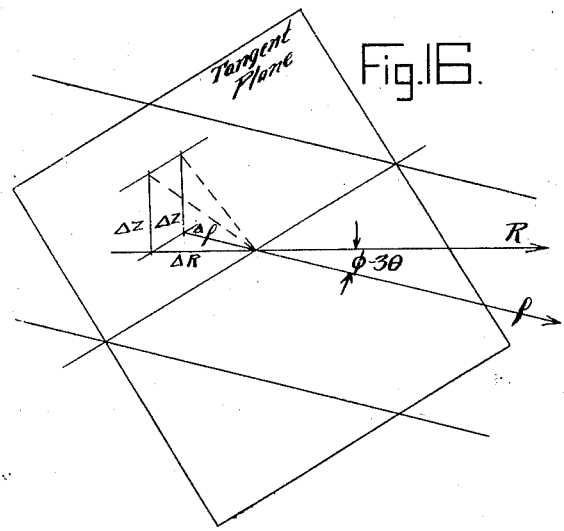
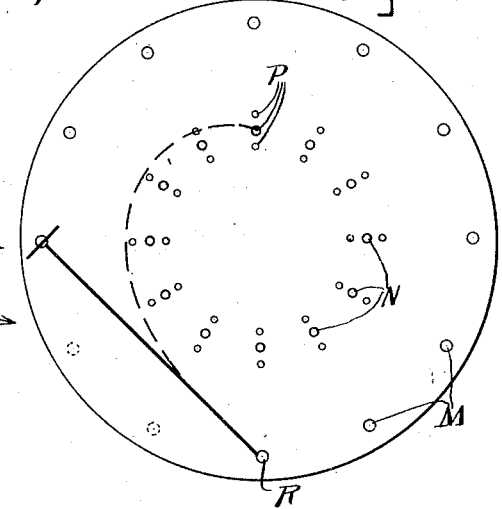
Inventor
James G. Dobie
By   *[signature]*
Attorney Patented Feb. 10, 1925.

1,526,268

UNITED STATES PATENT OFFICE.

JAMES GEORGE DOBIE, OF HUNTINGTON, WEST VIRGINIA.

LANDING STATION FOR AIRPLANES.

Application filed March 30, 1921. Serial No. 457,007.

*To all whom it may concern:*

Be it known that I, JAMES GEORGE DOBIE, a citizen of the United States, residing at Huntington, in the county of Cabell and State of West Virginia, have invented certain new and useful Improvements in Landing Stations for Airplanes, of which the following is a specification.

My said invention relates to a landing station for airplanes and the main object thereof is to provide a station such as may be erected in places where airplanes cannot land safely, such as cities, mountainous or swampy localities and the like. It is intended to provide for the industry of aerial transportation all of the advantages made available to the industry of railroad transportation by the most modern railroad terminals, and in addition to afford the private owner of an airplane all the advantages of a modern city garage. It is within the purview of my invention to provide a landing station which shall be equally useful regardless of the time of day or night or the direction of wind and which shall be capable of receiving an airplane at any desirable landing speed, i. e., any speed such as will insure certainty of maneuver. This station will also provide a smooth transition from the landing speed to a full stop regardless of the rate of decrease in speed. The station is equally well adapted to serve as a starting point for airplanes about to ascend into the air.

Another object is to provide an elevator adapted for prompt removal of airplanes from the bowl to permit other machines to alight therein or to ascend from the bowl, said elevator being adapted to convey the machines to any one of various levels for storage.

Another object is to provide in the structure space for waiting rooms, restaurants, drug stores or the like such as are commonly found in railroad stations; to provide hangar space for airplanes and space either in said hangars or independently therefrom where passengers may embark on or alight from a machine. Preferably I also provide garage space for automobiles.

A further object is to provide a signaling device which is adapted to indicate the point on the station where the airplanes should land, which can be readily changed according to the direction of the wind, and which will serve equally well as an indicator by day and by night.

Figure 1:
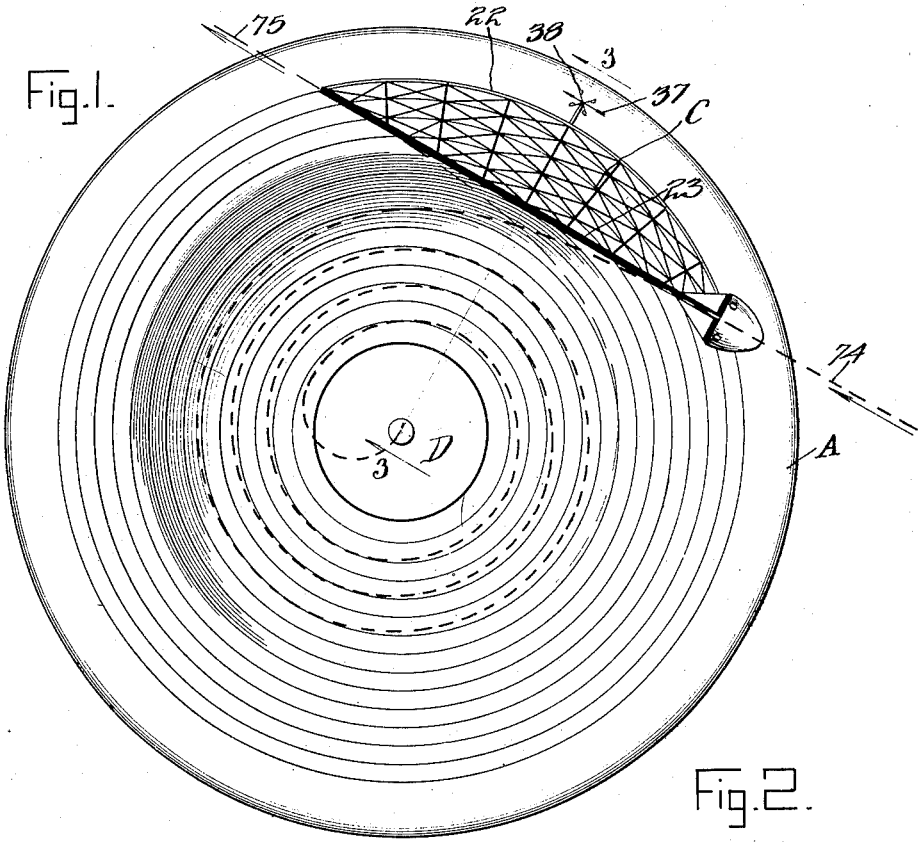
Figure 2:
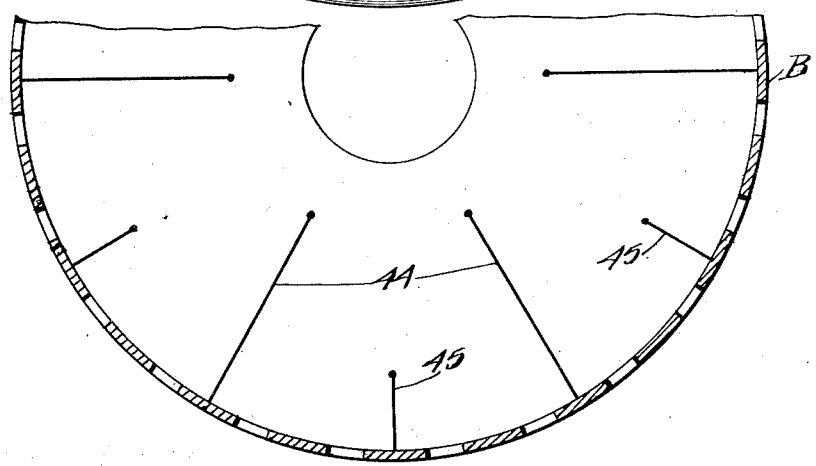

Referring to the accompanying drawings which are made a part hereof and on which similar reference characters indicate similar parts, Figure 1 is a plan of my landing station, Figure 2, a horizontal section through a portion of the same, Figure 3 is a vertical section through a portion of the structure, Figure 4, a vertical section through a portion of the upper wall, showing part of the means for varying the position of the signaling device, this figure including a part of what is shown in Figure 3, but on an enlarged scale, Figure 5 is a section on line 5—5 of Figure 4, Figure 6, a detail of the signaling device, Figure 7, a section on line 7—7 of Figure 6, Figure 8, a section on line 8—8 of Fig. 6, Figure 9, a vertical section taken through the elevator and adjacent parts, Figure 10, a horizontal section of the elevator and its shaft on line 10—10 of Figure 9, Figure 11, a detail of a device for preventing rotation of the elevator when at the top of the shaft, Figure 12, shows additional signaling means that may be used, and Figures 13 to 16 are geometrical figures used in connection with certain computations found hereinafter.

In the drawings reference character A indicates the upper surface or bowl which constitutes the roof of my landing station. The bowl is circular in outline and has a cylindrical outer wall B. On the bowl is a signaling device characterized generally by reference character C and at the center the bowl has an elevator D for receiving airplanes. The upper surface of the station on which the airplanes are to land or from which they are to take off is in the form of a bowl and while I do not limit myself to any specific conformation for this bowl the form which I at present prefer is a surface of revolution generated by the revolution about a vertical axis of a plane curve such as is hereinafter described. This curve is so proportioned that an airplane moving with specified speed and direction and alighting on the horizontal space provided at the highest part of the structure, will be constrained by the shape of the surface to follow a curved path, revolving, descending, and coming to rest at the center of the roof.

The roof of the structure is preferably made of concrete and the remainder of the structure may be constructed of the same material or of any preferred material adapted to the purpose. I prefer to have the outer edge of the bowl curved downwardly as shown so that an airplane which does not land at the preferred part of the surface or which happens to be steered incorrectly may be directed toward the inner portion of the bowl or may leave the bowl and resume its flight without undesirable consequences. The curved line on the roof indicates the normal course of an airplane which lands in the correct manner and position at the landing position indicated by the signaling device.

In the derivation of the curve used to generate this roof surface there enter a number of practical considerations such as; e. g., the size of the airplane, its ideal landing speed for such a structure, variations in speed caused by descent of slopes and by braking, variations from the theoretical path due to friction in the steering mechanism, and the adjustment of dimensions at various parts of the curve required to insure that the center of gravity of the moving airplane will conform to the theoretical conditions. It is considered sufficient however to present here the purely theoretical derivation assuming that an airplane having pivoted wheels would be as free to change direction to right or left as would a ball rolling on the surface. And for further simplicity the rolling ball will be assumed as having appreciable weight but very small diameter so that its center of gravity may be considered to move along the surface discussed.

An examination of the purpose of this surface shows that the curve used to generate it is logically divided into two parts: an upper curve designed to accept a body moving in a straight line and to divert it to a path of such curvature that it may revolve in a complete circle within the structure, and a lower curve so proportioned that as speed decreases the body descends along the surface in a spiral path and comes to rest at the center.

The derivation of the upper curve is now shown.

The path to be followed by a body moving on this upper surface should evidently have for its horizontal projection a curve similar to the lemniscate for, $a$) at its origin it is a straight line, $b$) its curvature increases with its length $c$) the greatest curvature has a definite value.

The equation of the lemniscate (Fig. 13) is:

$$r^2 = a^2 \cos 2\theta$$

And its radius of curvature may be derived as $$\rho = \frac{a^2}{3r} = \frac{a^2}{3a\sqrt{\cos 2\theta}} = \frac{a}{3\sqrt{\cos 2\theta}}$$

And when $$\theta = 0, \sqrt{\cos 2\theta} = 1$$

and $$\rho = \frac{a}{3}$$

Also when $$\theta = 45°, \sqrt{\cos 2\theta} = 0 \text{ and } \rho = \text{infinity.}$$

Showing that at O the radius of curvature is infinite,—the path is straight,—and at C the radius of curvature is $a/3$.

And from the properties of the lemniscate the direction of a normal to the curve at any point may be derived from the direction of a tangent to the curve at any point. (See Fig. 13).

$$\text{Tan } \psi = \frac{r}{\frac{dr}{d\theta}} = \frac{a\sqrt{\cos 2\theta}}{-a\frac{\sin 2\theta}{\sqrt{\cos 2\theta}}} = -\frac{\cos 2\theta}{\sin 2\theta} = -\cot 2\theta$$

Whence $\psi = 2\theta + 90°$.

But the inclination of the tangent to $$OX = T = \psi + \theta = 3\theta + 90°$$

And the inclination of the normal to $OX = 3\theta$.

But it is desirable to compute the elements of the lemniscate referred to the point D as origin in terms of R and $\varphi$ (Fig. 15) and the equations for this are:

$$R^2 = \frac{2}{AE} + \frac{2}{DE}$$

But $$AE = r \sin \theta = a\sqrt{\cos 2\theta} \sin \theta$$

And $$DE = OE - OD = r \cos \theta - \frac{2a}{3} = a\left(\sqrt{\cos 2\theta} \cdot \cos \theta - \frac{2}{3}\right)$$

And $$\frac{R}{a} = \sqrt{(\sqrt{-\cos 2\theta} \cdot \sin 0)^2 + \left(\sqrt{\cos 2\theta} \cdot \cos \theta - \frac{2}{3}\right)^2}$$

Similarly $$\phi = \tan^{-1} \frac{AE}{DE} = \frac{\sqrt{\cos 2\theta} \sin \theta}{\sqrt{\cos 2\theta} \cdot \cos \theta - \frac{2}{3}}$$

Or as given in the computation $$\phi = 90° - \tan^{-1} \frac{DE}{AE}$$

Now to constrain a rolling body moving at velocity V, to follow a path whose radius of curvature is $\rho$, the surface upon which it rolls must have a transverse inclination $x$ (Fig. 14) such that $$\operatorname{Tan} x = \frac{P}{W}$$

Where W is the weight
And P is the centrifugal force generated.
But $$P = \frac{MV^2}{\rho} = \frac{W}{g} \frac{V^2}{\rho}$$

Hence $$\operatorname{Tan} x = \frac{WV^2}{g\rho} \frac{1}{W} = \frac{V^2}{g\rho}$$

$$\frac{\triangle Z}{\triangle R} = \frac{V^2}{g\rho} \cos(\phi - 3\theta) = \frac{V^2}{g} \cdot \frac{1}{\frac{a}{3\sqrt{\cos 2\theta}}} \cdot \cos(\phi - 3\theta)$$

$$\frac{\triangle Z}{\triangle R} = \frac{3V^2}{ga} \sqrt{\cos 2\theta} \cdot \cos(\phi - 3\theta)$$

But $$\triangle Z = \frac{\triangle Z}{\triangle R} \cdot \triangle R = \frac{3V^2}{ga} \sqrt{\cos 2\theta} \, (\cos(\phi - 3\theta) \cdot \triangle R)$$

From which $\triangle Z$ may be computed to any desired degree of accuracy by taking sufficiently small values of $\triangle R$. And values of Z corresponding to the computed values of R may be found from a summation of $\triangle Z$.

The derivation of the lower curve will now be given. The function of this lower curve is to receive an airplane moving at velocity V along a circular path of radius $a/3$ and at an inclination $x$, and preserve it in transverse equilibrium as the velocity and radius decrease toward zero. As derived above:

$$\operatorname{Tan} x = \frac{V^2}{g\rho} \quad \text{But } \rho = R$$

and $$V = \frac{2\pi R}{t_1}$$

Where $t_1$ is the time required for one complete revolution. And if the velocity be assumed to vary with R then $$t_1 = \frac{K}{R}.$$

And since the direction of $\rho$ is transverse to the path, the transverse slope of the surface may be defined as the limit, as $\triangle \rho$ approaches O, of $$\frac{\triangle Z}{\triangle \rho} = \frac{V^2}{g\rho}$$

But the radial slope, that in the direction of R, is required in order to write the equation of the generating curve in terms of R and Z. And the relation of $$\frac{\triangle Z}{\triangle R} \text{ to } \frac{\triangle Z}{\triangle \rho}$$

is illustrated in Fig. 15 and Fig. 16.

The angle between R and $\rho$ at any point is seen to be $\phi - 3\theta$.

The transverse slope of the surface is that of a tangent plane whose inclination $x$ is measured by a vertical plane containing $\rho$. But the slope of the tangent plane measured by any other vertical plane, as that one containing R will vary with the cosine of the included angle, thus $$\frac{\triangle Z}{\triangle R} = \frac{\triangle Z}{\frac{\triangle \rho}{\cos(\phi - 3\theta)}} = \frac{\triangle Z}{\triangle \rho} \cos(\phi - 3\theta)$$

and $$V = \frac{2\pi R}{\frac{K}{R}} = \frac{2\pi R^2}{K}$$

Whence $$\operatorname{Tan} x = \frac{4\pi^2 R^4}{gK^2 R} = \frac{4\pi^2 R^3}{gK^2}$$

But $$\operatorname{Tan} x = \frac{\triangle Z}{\triangle R} = \frac{dZ}{dR} = \frac{4\pi^2 R^3}{gK^2}$$

And $$\int dZ = \frac{4\pi^2}{gK^2} \int R^3 dR$$

Whence $$Z = \frac{4\pi^2}{gK^2} \cdot \frac{R^4}{4} = \frac{\pi^2}{gK^2} R^4$$

Showing that this lower curve is a parabola of the fourth degree. The values assumed above for V and R determine K and then the curve may be plotted as accurately as desired.

As previously stated the outer wall B and the structure contained therein may be made of various materials. The roof or bowl A preferably has radial roof-beams 13 (Figure 4) which is this case are metallic I-beams straight or bent to proper curvature and secured in place in any desirable manner. Supported upon these I-beams are several curved metal troughs which provide a screen to which the concrete of the roof may be shaped during construction. Removable forms may be attached thereto between which the concrete is placed by means of the cement gun and thereafter troweled to the desired lines. I have indicated a metallic re-enforcement 14 which may be of any conventional sort and I also place within the outline of the roof inverted troughs 15 having in their side portions V-shaped grooves to receive the upper portions of the I-beams whereby the troughs are held in place. Braces 16 may extend across the trough for holding the sides in properly spaced relation and these braces may be held in place by any convenient means such as pins inserted through the braces outside the trough. At the upper side each trough-like structure is bent to provide an undercut groove 17. One purpose of this groove is to act as a drain for carrying off rain, melted snow and the like from the roof as by pipes 18 extending from the bottom of the groove. Evidently snow may be removed by shoveling it off or by melting it by means of heating pipes embedded in the concrete just below its surface. A light snow or skin of ice will not interfere with the use of my device as the surface is designed to maintain an airplane in transverse equilibrium by reason of its curvature.

At approximately the highest point on the roof an annular slot 19 is formed extending through the slab. At each side of the slot 19 a rack 20 is attached to the roof slab. An annular structure comprising a series of U-beams 21 spans the slot underneath the roof. This structure 21 is useful in connection with the signaling device, as are also the grooves 17.

The signaling device C comprises a network or lattice of any convenient form here shown as comprising strips of metal united as by rivets, and so put together as to lie closely against the roof surface. At its upper edge the net work or lattice is fastened to a strip of metal 22 in the form of an arc of a circle (Figure 1). At its lower edge the lattice work has attached thereto a strip of metal 23 shaped to conform to the curve of the roof and carrying a stripe of black paint or the like extending entirely across the lower edge of the lattice work. When viewed from above this strip is related to the strip 22 as a chord to its arc. At one end this strip is extended as shown and carries a housing 25. This housing is narrow enough so that the wheels of an ordinary airplane may pass on opposite sides thereof and is strong enough to sustain the load of an airplane if a wheel should pass over it. The housing contains search lights for signaling at night. Midway of the enlargement 24 is a black stripe extending at right angles across the adjacent end of the stripe on strip 23. Within the housing 25 is a search light 26 adapted to throw out a beam of white light along the strip 23 which has a series of reflectors suitably placed to throw the light so as to illuminate the line throughout its length. In conjunction with this search light there are a pair of search lights 27 and 28 of which 27 projects a beam of red light and 28 a beam of green light. By the arrangement of these lights the pilot will have correct information as to the angle at which he is approaching and also as his elevation. The lights 27 and 28 may be fixed in position while 26 is preferably adjustable by means of a screw threaded bolt 29 carrying a nut adapted to bear against a link 30 and by its adjustment swinging search light 26 on its pivot 31 so as to secure the best effect on the reflectors along the strip 23. If desired this light may also be adjustable for direction.

To move the signaling device to correct position for informing an aviator of the direction of the wind and the correct position for landing I provide a motor 32 carried by a downwardly projecting flange on the metallic strip 22. This motor is geared to a shaft carrying pinions 33 in mesh with the racks 20. A plurality of motors may be used if desired, spaced along the strip 22. For holding the lattice work down on the roof and guiding it in its travel I provide downwardly projecting flanges 34 formed on or attached to portions of the lattice work and carrying at their lower portions axles for roller bearings of rollers 35 which run on the opposite undercut portions of the groove 17. In this way the troughs 15 in addition to their functions as guides for the workmen in shaping the roof properly and as draining devices act also to provide tracks for the rolling anchors of the signaling device to hold the same in proper position on the roof. The entire device is intended to lie so close to the roof that an airplane will run over it without damage either to the machine or the signaling means. If necessary for the ready operation of the signaling device I may provide balls or rollers attached to the same and adapted to contact with the surface of the roof structure to diminish friction.

At some convenient location and preferably on the metal strip 22 about half way between its ends I provide a mast bearing at its upper end a wind vane 37 and a little lower down an anemometer 38. The anemometer is connected to electrical recording apparatus of any suitable type and below the roof slab I provide electrical contact members adapted to have sliding engagement with contact members on the roof which are connected to the operator's cab hereinafter described. Roller bearings resting on the roof and roller bearings extending vertically in the slot may be provided to assist in maintaining the mast for the wind vane and anemometer in proper position.

The structure underneath the roof comprises the exterior circular wall B, having doors and windows as desired and having also a series of floors 43, radially extending vertical partitions 44 and 45 and vertical annular or segmental partitions 46. These partitions form the lower space in which are rooms of varying shape and size, and where partitions are not desired columns 47 may be used for purposes of support. The floors may be connected by elevators or by staircases 48. Preferably the lower floors will be utilized to provide space for restaurants, storage places for oil, retail stores and the like, and garage space for automobiles, while one or more floors just below the bottom of the bowl will be used as hangars for airplanes. Other floors or parts thereof may be used for handling mail and express or as repair shops or for changing engines on through airplanes. In Figure 9 I have indicated two floors as intended for such use.

Extending downward from the lowermost portion of the bowl is an elevator shaft in which is located an elevator structure D of the plunger type for receiving airplanes and taking them to the level of the hangar or for carrying them up to the bowl when they are about to ascend. The elevator shaft has a well 49 below the level of the hangar floor 50 on the inner surface of which are supported pulleys 51 over which pass cables 52 which also pass under pulleys 53 on the plunger structure and which are attached to the brackets supporting pulleys 51 and have the usual counterweights at 54. Motors 55, of which only one is shown in the drawings, are connected to cables 56 to raise the elevator.

In order to secure the best results it is considered desirable that the elevator should operate without overhead supports; that no guide rails be used between the hangar floors, as they would obstruct the movement of airplanes to and from the elevator and that the platform be so designed as to permit complete revolution on its axis whereby an airplane may be turned in the proper direction with reference to its designated location on the hangar floor. To secure these results it is necessary that the plunger should not only transmit movement in a vertical direction to the platform but should also be so constructed as to preserve the proper alignment of the platform with the remainder of the structure. I have therefore shown the plunger as corresponding in size to the elevator shaft, the cables being connected to the bottom of the plunger. The plunger structure is here shown as hexagonal although the number of sides is not material to the invention and is provided at each corner with a guide shoe 57 adapted to engage between continuous guide rails 58 attached to the inner wall of the shaft. As here illustrated the elevator is projected to its greatest height and the guide shoes are in engagement with the guide rails for a distance corresponding to about one-half the length of the plunger. On the periphery of the opening in the bowl and also at each hangar floor there are sets of curved projections 59 between which similar curved projections 60 are adapted to engage. These projections 60 are attached to the fixed upper member 61 of the elevator structure. This upper member is rigidly connected to the uprights 62 of the elevator which have outwardly extending flanges forming the guide rails 57. Horizontal spacers 63 and diagonal braces 64 serve to hold the parts of the plunger in proper relation.

Upon the upper fixed member 61 are roller bearings 65 supporting a turn table 66, and vertical rollers 67 to center the same. A motor 68 is connected by means of a pinion to an annular rack 69 on the turn table to rotate the same. This table is moved up and down with upper member 61 to transport the airplane to and from the bowl and can be turned to direct the airplane toward the proper portion of the hangar floor or to turn in the desired direction an airplane about to ascend and it will be seen that there is nothing to interfere with the movement of the machine to and from the platform. I do not necessarily limit myself to this specific type of elevator as I may, for example, use an elevator in which guide rails would extend up to the bowl and need have only sufficient distance between the rails to admit an airplane when moved sidewise; i. e., the distance should be that of the small dimension of the machine or its distance from nose to tail. In this way it would be possible to provide a square elevator structure having four continuous guide rails whereby greater spacing could be had between the guide rails or alternatively machines may be used having detachable wings whereby the diameter of the elevator, as well as the spacing of the guide rails can be correspondingly reduced. To move the machines to and from the hangars in a sidewise direction I may provide small trucks which can be slipped under each wheel and which may be operated by hand or power as preferred. With this structure and this method of moving the machines a rotatable platform is unnecessary and the elevator may have merely a fixed upper floor. Whether the machines are moved sidewise or longitudinally it will probably be desirable to provide gasoline driven or electrically driven trucks for moving them to and from their places in the hangars.

Centrally positioned at the bottom of the bowl is an operator's cab 70 comprising a lower portion integral with the fixed member 61 of the elevator and an upper portion 71 integral with or fixed to the platform 66. Access is had to this cab by a gangway 72 of the elevator structure. As previously stated the wind vane and anemometer are electrically connected to indicating apparatus in the operating cab and thus the movements of the metal net-work may be regulated from the operating cab either manually or by electrical connection to the motors 32.

Figure 12 indicates additional lights which may be necessary to distinguish my device when seen from above, unmistakably from other structures and to avoid confusion with other searchlight beams; and also to facilitate the operation of taking off. The white lights M of the outer circle may be placed under the slot left in the roof for the continuous metal plate. The inner circle of white lights should be placed under suitable gratings, just at the dividing line between the upper and lower curves as at N. In addition to the latter there should be several circles of colored lights so placed that when one end of the black line is at R the radial bar of colored lights at P may be illuminated to indicate the beginning of the path to be taken by an ascending airplane in order that it may take off from the point R directly toward the existing wind.

Operation.

When an incoming airplane signals to the operator, preferably by wireless telephone, the operator will indicate permission to land as for example by a visible signal and if the metallic network is not in the proper position indicated by the wind vane and anemometer he will move it to such position. This will give the aviator the proper direction and he will then approach from that direction at the proper speed and elevation to make a landing. When he achieves a correct relation to the roof he will depress the end of the airplane to make contact as along the heavily dotted line 74, on Figure 1, the arrow indicating the direction of movement. Contact should be made at the intersection of the black lines or at the crossing point of the beams of light, according to whether it is day time or night. He will then preferably throttle the engine down to idling speed, when the airplane will continue to move due to its momentum. When it lands it will immediately start to bank due to the shape of the surface on which it lands, which tendency may be increased by the pilot just prior to or at the moment of landing. Thereafter as banking increases the curvature of the path traced by the airplane as indicated by the heavily dotted line will increase until it moves in a complete circle. At the point where the motion begins to be a circular one the inclination of the surface is just sufficient to provide a normal re-action that will hold in equilibrium the resultant of the centrifugal force due to the revolution of the airplane and the force of gravity. But due to friction and to braking power that may be provided by the pilot if the machine is so equipped its speed will decrease and hence the centrifugal force will decrease allowing the airplane to change direction automatically by means of its pivoted wheels and to turn inward and downward moving always in transverse equilibrium and at a speed always decreasing until it comes to rest near the center of the surface; i. e., on or approximately within the confines of the upper surface of the elevator or of the rotatable platform on the elevator. The airplane will then be moved to the center of the elevator in any desirable manner and the elevator lowered to the hangar level. If an elevator such as shown in Figure 9 is used the turn table may then be moved to head the machine in proper direction and the machine moved into its stall. The elevator is then free to move up to receive another airplane or it may receive an outgoing airplane and lift it to the roof, when the machine may be cranked and starting forward move at increasing speed upon the ascending surface along dotted line 75 until it attains sufficient speed to move from the edge and fly away.

The black line on the signaling device indicates the direction for taking off, and the machine should follow line 75 in the direction indicated by the arrow thereon.

I regard as of peculiar importance the special shape of the roof whereby a descending airplane will tend automatically to take a proper course toward the center of the roof. I do not, however, limit myself to the precise contour shown on the drawings nor do I limit myself to any particular kind of elevator or other auxiliary mechanism such as I have herein set forth. Numerous modifications of such devices will occur to those skilled in this and related arts and the true scope of my invention is set forth in the appended claims.

Having thus fully described my said in- vention, what I claim as new and desire to secure by Letters Patent, is:

1. A starting and landing station for aircraft comprising a structure having a bowl shaped roof flaring outwardly at the rim to provide a surface for taking off and for receiving aircraft, substantially as set forth.

2. A starting and landing station for aircraft comprising a structure having a bowl shaped roof rising from the center toward the rim, the upper surface being generated by the revolution of a plane curve, substantially as set forth.

3. A starting and landing station for aircraft comprising a structure having a bowl shaped roof highest in the region of the rim, the upper surface being generated by the revolution of a plane curve, whose upper limb is derived from a lemniscate and whose lower limb is a parabola of the fourth degree, substantially as set forth.

4. A starting and landing station for aircraft having a bowl shaped roof substantially flat near the outer periphery and descending nearly to the center by a curve of gradually increasing pitch, the central portion being formed by a curve of gradually decreasing pitch, substantially as set forth.

5. A starting and landing station for aircraft comprising a structure having a circular outer wall and a roof curving upwardly and inwardly therefrom and thereafter curving inwardly and downwardly toward a substantially flat central portion, substantially as set forth.

6. A starting and landing station for aircraft comprising a circular outer wall and a portion curving upward and inward from the eaves having a narrow annular substantially flat expanse and curved downwardly therefrom toward a substantially flat central portion, substantially as set forth.

7. A starting and landing station for aircraft comprising an outer circular wall and a roof extending inwardly therefrom, the outer portion of the same having in section the shape of a lemniscate and the inner portion extending therefrom as a curve of gradually increasing and then gradually decreasing pitch to a substantially flat central portion, substantially as set forth.

8. A starting and landing station for aircraft comprising a bowl shaped structure and an elevator adapted to receive aircraft therefrom, said elevator having an upper surface adapted to match with that of the bowl, substantially as set forth.

9. A starting and landing station for aircraft comprising a bowl shaped structure, an elevator constituting the central portion of the same, said elevator having a curved upper surface merging into that of the bowl, substantially as set forth.

10. A starting and landing station for aircraft comprising a bowl shaped structure, an elevator at the center of the structure, said elevator having an upper part with a curved surface merging into that of the bowl and said part being rotatably mounted, substantially as set forth.

11. A starting and landing station for aircraft embodying a bowl shaped structure, an elevator at the center of the bowl, means for moving the elevator up and down and means for rotating the upper end portion of the elevator, substantially as set forth.

12. A starting and landing station for aircraft embodying a structure having a bowl shaped roof, said structure being several stories in height and containing spaces arranged as hangars and an elevator adapted to convey aircraft from the hangars to the roof and vice versa, substantially as set forth.

13. A starting and landing station for aircraft comprising a structure having a roof, an elevator whose upper portion is adapted to be positioned flush with the roof, the lower portion of the structure containing space for hangars and the upper portion of the elevator being rotatable, substantially as set forth.

14. A starting and landing station for aircraft comprising a bowl-shaped structure and a signaling device movable bodily about said structure and embodying means to indicate the direction of the wind, substantially as set forth.

15. A starting and landing station for aircraft comprising a roof having a receiving surface, an elevator having an upper portion adapted to convey aircraft to and from said surface, a signaling device movably mounted on the surface, power-operated means for moving the same and means connected thereto for indicating the speed and direction of the wind, substantially as set forth.

16. A starting and landing station for aircraft comprising a structure having a bowl shaped upper surface and a signaling device shaped to conform to a portion of the surface and adapted to be moved circumferentially thereof, substantially as set forth.

17. A starting and landing station for aircraft comprising a structure having a bowl shaped upper surface, a signalling device conforming to a portion of said surface, means for moving the same about the surface and means connected to the signaling device for indicating the speed and direction of the wind, substantially as set forth.

18. A starting and landing station for aircraft embodying a receiving surface and a signaling device comprising a strip of metal contrasting in color with the color of the supporting surface and said strip of metal having reflecting devices thereon and having at one end a housing for a search light adapted to throw a beam along the strip whereby the light is reflected from said reflecting surface, substantially as set forth.

19. A starting and landing station for aircraft embodying a bowl shaped upper surface and a signaling device resting thereon, said signaling device comprising a net work adapted to conform to the surface, a segmental metallic strip extending along one edge of the net work and forming an arc of a circle, said arc subtended by a chord comprising a second metallic strip, said second strip being colored in contrast to the color of the supporting structure and having reflecting surfaces, and a light signal at one end of the second strip including means for throwing a beam of light along the same so as to impinge on the reflecting surfaces thereon, substantially as set forth.

20. A starting and landing station for aircraft embodying a bowl shaped structure, a signaling device comprising means to give a visual signal by day or by night and means for moving the signaling device circumferentially of said surface, substantially as set forth.

21. A starting and landing station for aircraft embodying a supporting surface therefor, said surface having a slot, a signaling device mounted adjacent said slot, and means in the slot for moving the signaling device circumferentially of the surface, substantially as set forth.

22. A starting and landing station for aircraft embodying a supporting surface therefor, said surface having a slot, a signaling device mounted adjacent said slot, means in the slot for moving the signaling device circumferentially of the surface, said means comprising an annular rack bar, a pinion meshing therewith and a motor for driving the pinion, substantially as set forth.

23. A starting and landing station for aircraft comprising a signaling device having a longitudinally extending stripe of a color contrasting with that of the aircraft receiving surface, a second stripe extending across the first at one end, a second signaling means thereon comprising angularly directed search lights and means for moving the whole about the surface, substantially as set forth.

24. A starting and landing station for aircraft comprising a bowl shaped roof, a signaling device adapted to conform to a portion of the bowl and comprising means for giving a visual indication by day and by night, substantially as set forth.

25. A starting and landing station for aircraft comprising a bowl-shaped upper roof, a strip of metal adapted to conform to a portion thereof, the said strip having thereon means for reflecting a beam of light, means for casting a beam of light along the strip and means adjacent to the first to direct diverging beams of colored light over the base of the first beam, substantially as set forth.

26. A starting and landing station for aircraft comprising a landing surface, an elevator adapted to carry aircraft to and from said surface, the upper portion of said elevator being rotatable and an operator's cab mounted centrally of the elevator and projecting above the same, substantially as set forth.

27. A starting and landing station for aircraft comprising a bowl-shaped supporting surface, an elevator, adapted to convey aircraft to and from the same, a well structure having its upper extremity at the level assumed by the upper surface of the elevator when in its lowest position and means for moving the elevator to intermediate points between the surface and the upper extremity of the well structure, substantially as set forth.

28. A starting and landing station for aircraft comprising a bowl-shaped supporting structure, an elevator adapted to convey aircraft to and from the same, said elevator having a plunger structure of substantially the same cross section as the aircraft supporting portion, a well structure comprising a plurality of guides for the plunger and means located intermediate of said guides for moving the elevator, substantially as set forth.

29. A starting and landing station for aircraft embodying a supporting surface and an elevator, said elevator having a rotatable upper portion, supporting means therefor and a plunger structure of cross section substantially equivalent to the area of said supporting portion, substantially as set forth.

30. A starting and landing station for aircraft comprising a supporting surface, a circular elevator, means for rotating the upper portion of the elevator, a supporting plate for said upper portion and means for holding said plate against rotation, substantially as set forth.

31. A starting and landing station for aircraft comprising a bowl-shaped landing surface, means for indicating the outline of the device to an approaching aviator by day or by night, and means to indicate the correct direction of approach and the correct position for making contact with the surface by day or by night, substantially as set forth.

32. A starting station for aircraft comprising a circular supporting surface, and means subtending a minor arc of the circle for indicating the correct position for taking off so as to move into the eye of the wind, substantially as set forth.

33. A starting station for aircraft comprising a circular supporting surface, means for indicating the direction of motion in taking off, said means subtending a minor arc of the circular surface and indicating the best position for taking off, substantially as set forth.

34. A circular starting and landing station for airplanes comprising a circle of lights near the edge, a plurality of diametrically arranged series of lights to indicate positions for taking off, and an elongated device adapted to be moved circumferentially of the station to indicate the direction of movement at that time, and also arranged to render active the diametrical row of lights adjacent its forward end, substantially as set forth.

35. A starting and landing station for aircraft comprising a bowl-shaped roof whose upper surface is generated by the revolution of a plane curve consisting of an upper portion and a lower portion differing in type, and signaling means to indicate the boundary between the parts of the bowl surface generated by the respective portions of the curve, substantially as set forth.

36. A starting and landing station for aircraft comprising a bowl-shaped roof whose upper surface is generated by the revolution of a plane curve consisting of an upper portion and a lower portion differing in type, and a signaling system including means to indicate the outline of the bowl, and means to indicate the boundary between the parts of the bowl surface generated by the respective portions of the curve, substantially as set forth.

37. A starting and landing station for aircraft comprising a bowl-shaped roof whose upper surface is generated by the revolution of a plane curve consisting of an upper portion and a lower portion differing in type, and a signaling system including means to indicate the outline of the bowl, and means to indicate the boundary between the parts of the bowl surface generated by the respective portions of the curve, constituent elements of such signaling means being arranged along lines radiating from the center of the bowl, substantially as set forth.

38. A starting and landing station for aircraft comprising a bowl-shaped roof whose upper surface is generated by the revolution of a plane curve consisting of an upper portion and a lower portion differing in type, and a signaling system comprising indicating means arranged in concentric circles relative to the roof and forming visual indications on its upper surface, substantially as set forth.

39. A starting and landing station for aircraft comprising a bowl-shaped roof whose upper surface is generated by the revolution of a plane curve consisting of an upper portion and a lower portion differing in type, and a signaling system comprising indicating means arranged in concentric circles relative to the roof and forming visual indications on its upper surface, individual element of such indicating means being arranged along lines radiating from the center of the bowl, substantially as set forth.

40. A starting and landing station for aircraft comprising a bowl-shaped roof whose upper surface is generated by the revolution of a plane curve consisting of an upper portion and a lower portion differing in type, and a signaling system comprising indicating means arranged in concentric circles relative to the roof and forming visual indications on its upper surface, individual elements of such indicating means being arranged along lines radiating from the center of the bowl, and a movable signaling device cooperating therewith, substantially as set forth.

41. A starting and landing station for aircraft comprising a bowl-shaped roof whose upper surface is generated by the revolution of a plane curve consisting of an upper portion and a lower portion differing in type, and a signaling system comprising indicating means arranged in concentric circles relative to the roof and forming visual indications on its upper surface, individual elements of such indicating means being arranged along lines radiating from the center of the bowl, and a movable signaling device cooperating therewith, certain ones of the radially arranged elements being normally inactive and arranged to be made active by juxtaposition of said movable device, substantially as set forth.

42. A starting and landing station for aircraft comprising a bowl-shaped roof whose upper surface is generated by the revolution of a plane curve consisting of an upper portion and a lower portion differing in type, and signaling means comprising a plurality of groups of normally-inactive diametrically arranged signal lights, a movably mounted wind-direction indicator on the roof adapted to render active a corresponding group of such lights, and a plurality of lights arranged about the outline of the bowl and free from control by said indicator, substantially as set forth.

43. A starting and landing station for airplanes comprising a structure having a bowl shaped roof so proportioned as to divert an alighting airplane from a straight path to a path of increasing curvature and to preserve the moving airplane in transverse equilibrium however slowly its speed decreases from the highest desirable landing speed to a full stop, substantially as set forth.

44. A landing station for aircraft comprising a metal strip movable to indicate the direction of the wind, means controlled by the drive of the wind for automatically removing the strip and means for illuminating the same, to give a visual indication by night, substantially as set forth.

45. A landing station for aircraft comprising a metal strip movable to indicate the direction of the wind, means for illuminating the same to give a visual indication, and means for directing colored beams of light at an angle upward from said strip, substantially as set forth.

46. A landing station for aircraft comprising a supporting surface therefor having a circular slot, a strip of material defining a segment of a circle, means whereby the strip may be moved about the surface to indicate the direction of the wind and means for causing the ends of the strip to follow the circle, substantially as set forth.

47. A starting and landing station for aircraft comprising a signalling device having a longitudinally extending stripe of a color contrasting with that of the aircraft receiving surface, a second stripe extending across the first at one end, and means whereby the same may be moved about the surface to indicate the direction of the wind, the signalling device lying close to said receiving surface to avoid damage by contact with the wheels of aircraft, substantially as set forth.

In witness whereof, I have hereunto set my hand and seal at Huntington, West Virginia, this twenty-fifth day of March, A. D. nineteen hundred and twenty-one.

JAMES GEORGE DOBIE. [L. S.]

Witnesses:
W. F. Howell,
Beatrice R. Dobie.